US009312997B2

(12) United States Patent
Kim et al.

(10) Patent No.: US 9,312,997 B2
(45) Date of Patent: Apr. 12, 2016

(54) METHOD FOR TRANSMITTING OR RECEIVING PDCCH AND USER EQUIPMENT OR BASE STATION FOR THE METHOD

(75) Inventors: Kijun Kim, Anyang-si (KR); Daewon Lee, Anyang-si (KR); Hanbyul Seo, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 149 days.

(21) Appl. No.: 14/129,876

(22) PCT Filed: Jul. 11, 2012

(86) PCT No.: PCT/KR2012/005492
§ 371 (c)(1),
(2), (4) Date: Dec. 27, 2013

(87) PCT Pub. No.: WO2013/009089
PCT Pub. Date: Jan. 17, 2013

(65) Prior Publication Data
US 2014/0133427 A1    May 15, 2014

Related U.S. Application Data

(60) Provisional application No. 61/506,646, filed on Jul. 12, 2011.

(51) Int. Cl.
*H04L 5/00* (2006.01)
*H04L 5/14* (2006.01)

(52) U.S. Cl.
CPC ............ *H04L 5/0037* (2013.01); *H04L 5/0053* (2013.01); *H04L 5/0094* (2013.01); *H04L 5/0023* (2013.01); *H04L 5/1469* (2013.01)

(58) Field of Classification Search
None
See application file for complete search history.

(56) References Cited

U.S. PATENT DOCUMENTS

| 8,249,608 | B2* | 8/2012 | Heo et al. ............... 455/450 |
| 8,767,649 | B2* | 7/2014 | Kwon et al. ............. 370/329 |
| 9,031,025 | B2* | 5/2015 | Nakao ................. H04L 5/001 370/329 |
| 2008/0225786 | A1* | 9/2008 | Han et al. ............... 370/329 |
| 2008/0274749 | A1 | 11/2008 | Heo et al. |
| 2010/0157922 | A1* | 6/2010 | Kim .................. H04L 5/0094 370/329 |

(Continued)

FOREIGN PATENT DOCUMENTS

WO    WO 2010126259 A2 *  11/2010

OTHER PUBLICATIONS

PCT International Application No. PCT/KR2012/005492, Notification of Transmittal of the International Search Report and the Written Opinion of the International Searching Authority, or Declaration dated Jan. 24, 2013, 9 pages.

(Continued)

*Primary Examiner* — Benjamin H Elliott, IV
*Assistant Examiner* — Eric Nowlin
(74) *Attorney, Agent, or Firm* — Lee, Hong, Degerman, Kang & Waimey

(57) ABSTRACT

A method for receiving a physical downlink control channel (PDCCH) at a downlink subframe through a user equipment (UE) in a wireless communication system comprises the step of detecting the PDCCH by performing blind decoding for a search space including a plurality of PDCCH candidates included in the downlink subframe, wherein the blind decoding is performed in accordance with order of priority given to each of a plurality of sub-search spaces constituting the search space.

12 Claims, 8 Drawing Sheets

(56) References Cited

U.S. PATENT DOCUMENTS

| | | |
|---|---|---|
| 2010/0260124 A1 | 10/2010 | Noshio et al. |
| 2011/0085506 A1 | 4/2011 | Lee et al. |
| 2011/0110316 A1 | 5/2011 | Chen et al. |
| 2011/0143796 A1 | 6/2011 | Lee et al. |
| 2013/0336252 A1* | 12/2013 | Hsieh .................... H04L 5/0053 370/329 |

OTHER PUBLICATIONS

Motorola, "Search Space Definition: Reduced PDCCH Blind Detection for Split PDCCH Search Space," 3GPP TSG RAN1 #51, R1-074583, Nov. 2007, 4 pages.

LG-Nortel, "R-PDCCH Multiplexing for LTE-A relay node," 3GPP TSG RAN WG1 #61, R1-103145, May 2010, 6 pages.

European Patent Office Application Serial No. 12811243.0, Search Report dated Feb. 24, 2015, 8 pages.

* cited by examiner

Fig. 1
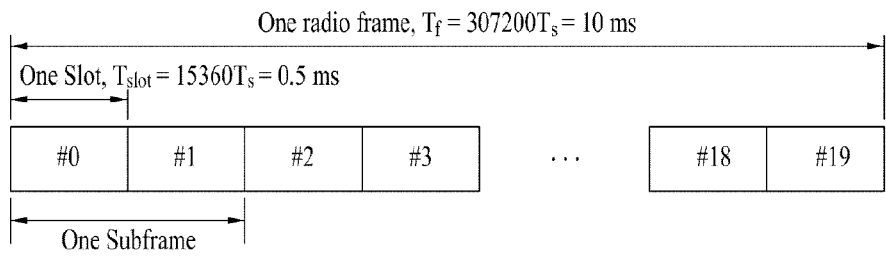
(a)
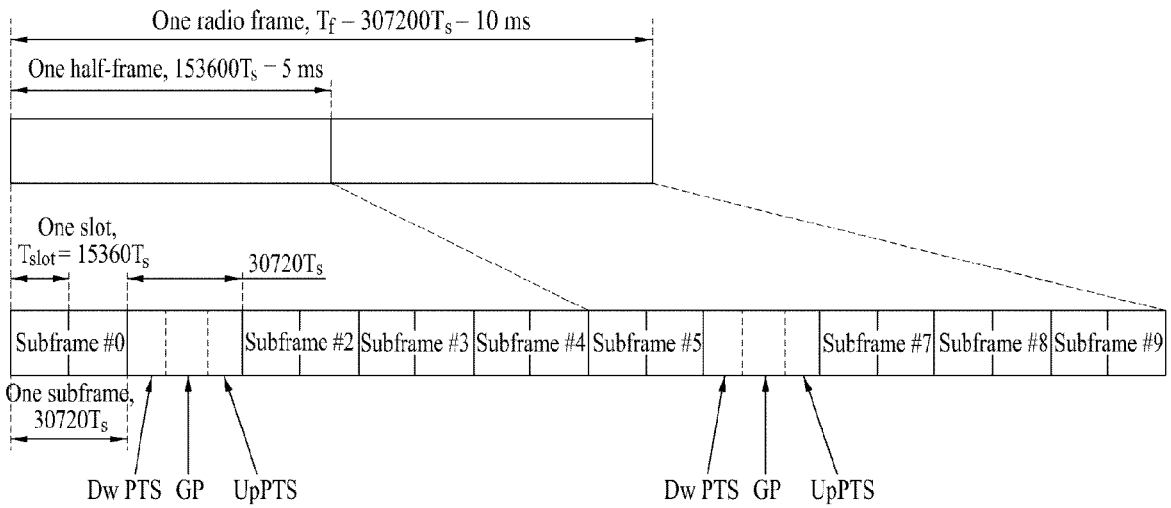
(b)

Fig. 3
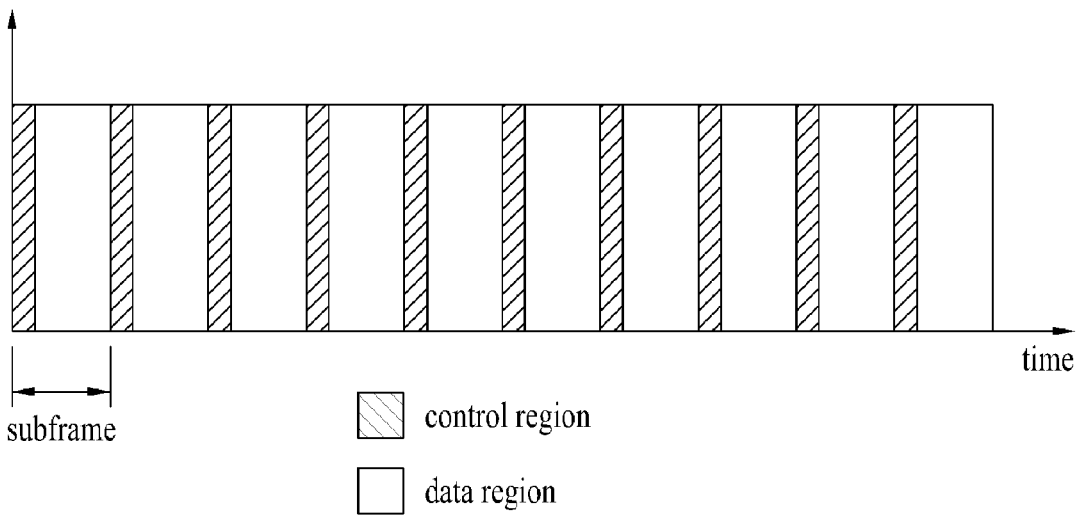
Fig. 4
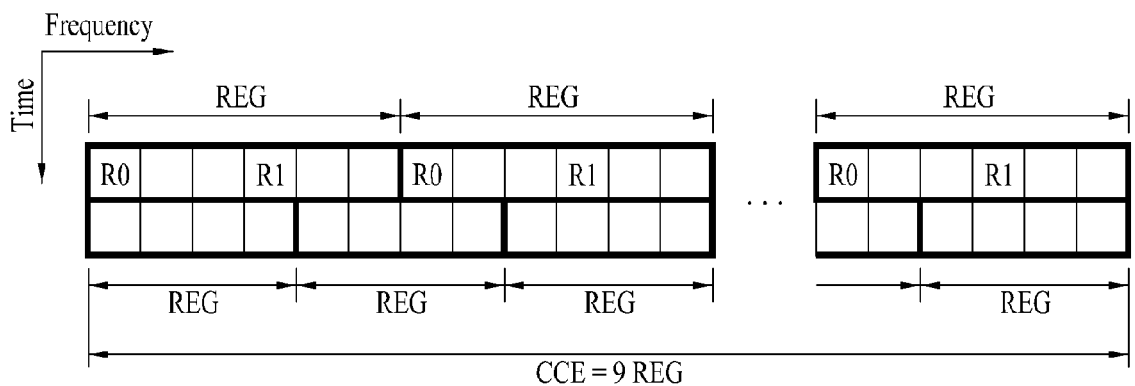
(a) 1 or 2 TX case
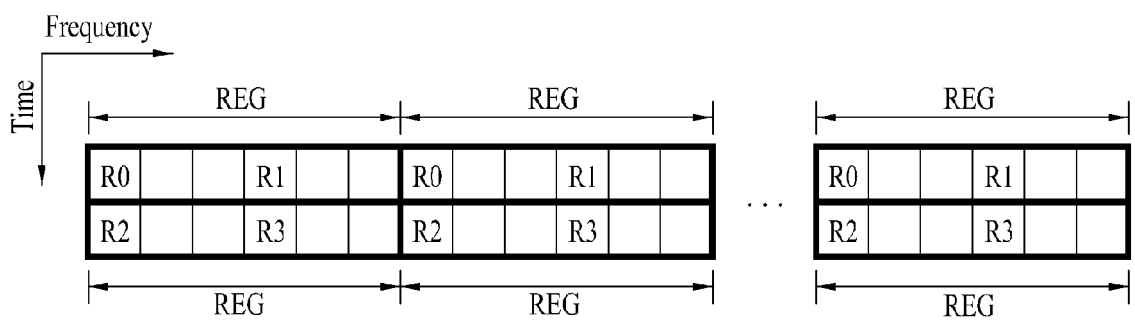
(b) 4 TX case

METHOD FOR TRANSMITTING OR RECEIVING PDCCH AND USER EQUIPMENT OR BASE STATION FOR THE METHOD

CROSS-REFERENCE TO RELATED APPLICATIONS

This application is the National Stage filing under 35 U.S.C. 371 of International Application No. PCT/KR2012/005492, filed on Jul. 11, 2012, which claims the benefit of U.S. Provisional Application Ser. No. 61/506,646, filed on Jul. 12, 2011, the contents of which are all hereby incorporated by reference herein in their entirety.

TECHNICAL FIELD

The present invention relates to a wireless communication system, and more particularly to a method and apparatus for transmitting or receiving a PDCCH in a wireless communication system.

BACKGROUND ART

In a 3rd generation partnership project long term evolution (-advanced) (3GPP LTE(-A)) communication system, various channels for an uplink and a downlink are defined in a physical layer used for actual signal transmission. For example, a Physical uplink shared channel (PUSCH), a Physical uplink control channel (PUCCH), a Physical random access channel (PRACH), etc. are defined as uplink physical channels, and a Physical downlink shared channel (PDSCH), a Physical multicast channel (PMCH), a Physical broadcast channel (PBCH), a Physical control format indicator channel (PCFICH), a Physical downlink control channel (PDCCH), a Physical hybrid ARQ indicator channel (PHICH), etc. are defined as downlink physical channels. Hereinafter, "physical" will be omitted from the above channels unless there is any confusion.

The downlink control channel (PDCCH) of the above channels is the channel for transmitting scheduling allocation control information and other control information. In a cellular communication system in which one base station (Node-B) controls a plurality of user equipments (UEs or mobile stations), the several user equipments UEs may receive control information through the PDCCH. At this time, since there is limitation in the number of PDCCHs that may be transmitted from the base station at one time, the base station does not previously allocate different PDCCHs to the respective user equipments UEs but transmits control information to a random user equipment UE through a random PDCCH at respective timing. As a result, the user equipment UE knows that control information transmitted through the PDCCH corresponds to the UE through a user equipment UE identifier included in the PDCCH. At this time, the user equipment UE performs decoding for a plurality of PDCCHs (for a plurality of available PDCCH formats) at respective timing. And, if the user equipment UE determines that the PDCCH corresponds to the user equipment UE, it is operated by receiving the control information.

Meanwhile, although various communication techniques have been developed and implemented, since a size of a control region to which the PDCCH may be transmitted is the same as that of the related art, PDCCH transmission restricts system throughput. Accordingly, in order to prevent system throughput from being restricted by the PDCCH transmission, there has been a discussion that PDCCH transmission should be performed using a PDSCH region of a downlink (DL) subframe. However, since PDCCH transmission based on the PDSCH region enables decoding after one subframe is completely received, a processing time for decoding or demodulation is not sufficient as compared with PDCCH transmission through a control region of a subframe according to the related art.

DISCLOSURE OF INVENTION

Technical Problem

An object of the present invention devised to solve the conventional problem is to provide a method and apparatus for transmitting or receiving a PDCCH in a wireless communication system, in which a search space for a user equipment UE is divided into a plurality of sub-search spaces and order of priority is given to each of the sub-search spaces, whereby each user equipment UE may perform decoding for downlink control information in the order of priority of the sub-search spaces.

It will be appreciated by persons skilled in the art that the objects that could be achieved with the present invention are not limited to what has been particularly described hereinabove and the above and other objects that the present invention could achieve will be more clearly understood from the following detailed description.

Solution to Problem

To solve the aforementioned technical problems, according to one aspect of the present invention, a method for receiving a physical downlink control channel (PDCCH) at a downlink subframe through a user equipment (UE) in a wireless communication system comprises the step of detecting the PDCCH by performing blind decoding for a search space including a plurality of PDCCH candidates included in the downlink subframe, wherein the blind decoding is performed in accordance with order of priority given to each of a plurality of sub-search spaces constituting the search space.

Preferably, the search space may be configured in some band of a data region of the downlink subframe.

Preferably, the method may further comprise the step of starting demodulation for a physical downlink shared channel (PDSCH) designated by the PDCCH, if the result of the blinding decoding is successful.

Preferably, the method may further comprise the step of performing blind decoding for the sub-search space with low priority, if the result of the blind decoding for the sub-search space with high priority is not successful.

Preferably, the order of priority given to each of the plurality of sub-search spaces is determined on the basis of data transmission information or an aggregation level of the sub-search space indicated by the PDCCH, and the data transmission information may include at least one of a transmission data rate of a physical downlink shared channel (PDSCH), a payload size of transmission data, a transmission modulation scheme, and the number of resource blocks allocated to the PDSCH.

In another aspect of the present invention, a user equipment configured to receive a physical downlink control channel (PDCCH) at a downlink subframe in a wireless communication system comprises a radio frequency (RF) unit; and a processor, wherein the processor is configured to detect the PDCCH by performing blind decoding for a search space including a plurality of PDCCH candidates included in the downlink subframe, and the processor is configured to perform the blind decoding in accordance with order of priority given to each of a plurality of sub-search spaces constituting the search space.

Preferably, the search space may be configured in part of band of a data region of the downlink subframe.

Preferably, wherein the processor may be configured to start demodulation for a physical downlink shared channel (PDSCH) designated by the PDCCH, if the result of the blinding decoding is successful.

Preferably, the processor may be configured to perform blind decoding for the sub-search space with low priority, if the result of the blind decoding for the sub-search space with high priority is not successful.

Preferably, the order of priority given to each of the plurality of sub-search spaces is determined on the basis of data transmission information or an aggregation level of the sub-search space indicated by the PDCCH, and the data transmission information may include at least one of a transmission data rate of a physical downlink shared channel (PDSCH), a payload size of transmission data, a transmission modulation scheme, and the number of resource blocks allocated to the PDSCH.

In still another aspect of the present invention, a method for transmitting a physical downlink control channel (PDCCH) at a downlink subframe from a base station to a user equipment (UE) in a wireless communication system comprises the steps of dividing a search space including a plurality of PDCCH candidates included in the downlink subframe into a plurality of sub-search spaces; giving order of priority to each of the plurality of sub-search spaces; and transmitting the PDCCH to the user equipment through the sub-search spaces on the basis of the given order of priority.

Preferably, the search space may be configured in part of band of a data region of the downlink subframe.

Preferably, the order of priority given to each of the plurality of sub-search spaces is determined on the basis of data transmission information or an aggregation level of the sub-search space indicated by the PDCCH, and the data transmission information may include at least one of a transmission data rate of a physical downlink shared channel (PDSCH), a payload size of transmission data, a transmission modulation scheme, and the number of resource blocks allocated to the PDSCH.

In further still another aspect of the present invention, a base station transmitting a physical downlink control channel (PDCCH) to a user equipment at a downlink subframe in a wireless communication system comprises a radio frequency (RF) unit; and a processor, wherein the processor is configured to divide a search space including a plurality of PDCCH candidates included in the downlink subframe into a plurality of sub-search spaces, give order of priority to each of the plurality of sub-search spaces, and transmit the PDCCH to the user equipment through the sub-search spaces on the basis of the given order of priority.

Preferably, the search space may be configured in part of band of a data region of the downlink subframe.

Preferably, the order of priority given to each of the plurality of sub-search spaces is determined on the basis of data transmission information or an aggregation level of the sub-search space indicated by the PDCCH, and the data transmission information may include at least one of a transmission data rate of a physical downlink shared channel (PDSCH), a payload size of transmission data, a transmission modulation scheme, and the number of resource blocks allocated to the PDSCH.

The aforementioned technical solutions are only a part of the preferred embodiments of the present invention, and various modifications to which technical features of the present invention are applied could be understood by the person with ordinary skill in the art to which the present invention pertains, based on the following detailed description of the present invention.

Advantageous Effects of Invention

According to the embodiments of the present invention, reception and processing of a control channel transmitted through part of band may be performed more efficiently. Also, lack of data processing time at a receiving side, which occurs due to the control channel transmitted through part of the band, may be solved.

In more detail, the base station divides a search space for PDCCH into a plurality of sub-search spaces and gives order of priority to each of the sub-search spaces, whereby each UE may perform blind decoding for PDCCH corresponding to the sub-search space with high priority to transmit, receive and process the PDCCH without any problem.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a diagram illustrating an example of a structure of a radio frame used in a wireless communication system;

FIG. 3 is a diagram illustrating a structure of a downlink frame;

FIG. 4 is a diagram illustrating a resource unit constituting a control region;

MODE FOR THE INVENTION

Figure 2:
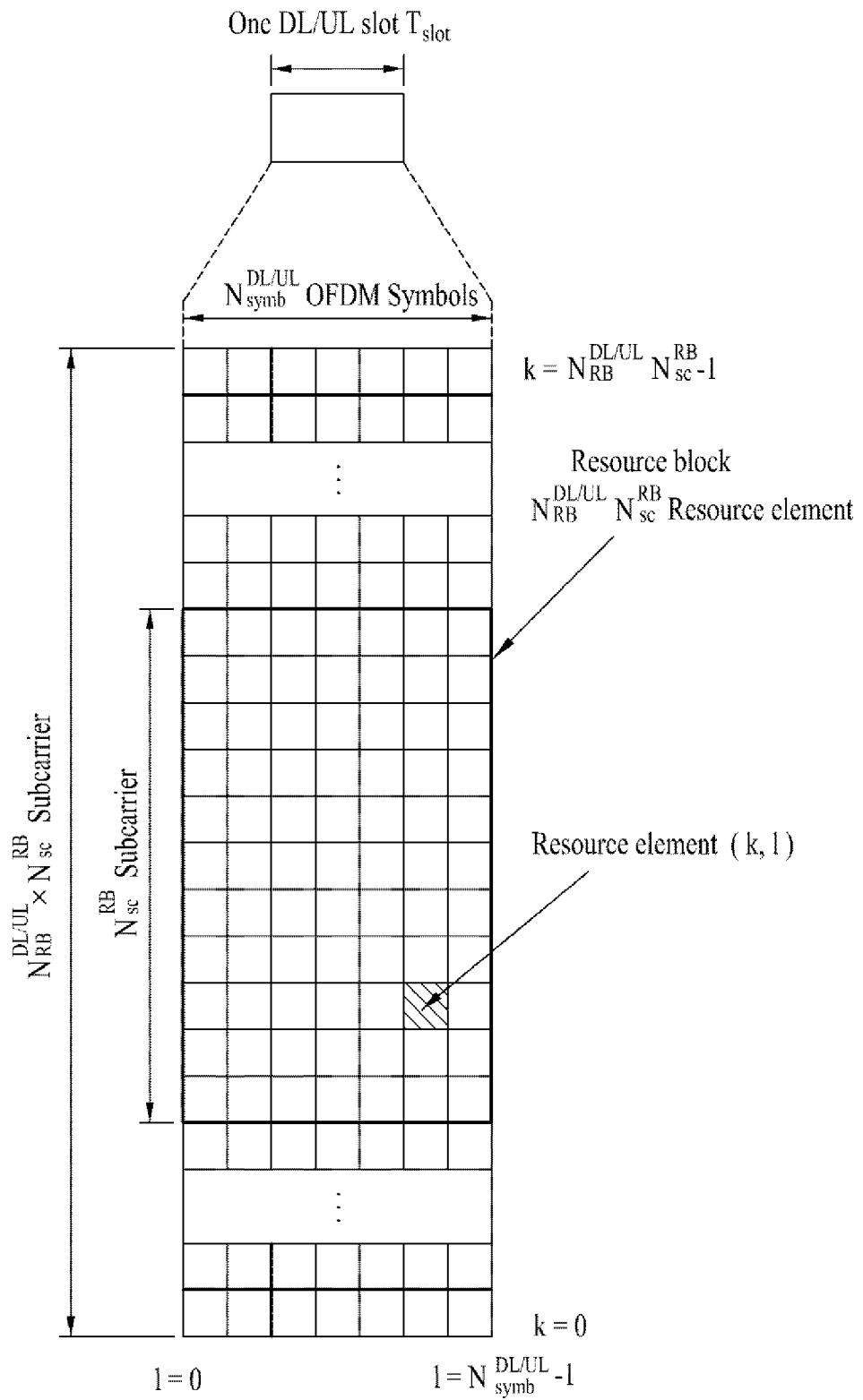
FIG. 2 is a diagram illustrating an example of a downlink/uplink (DL/UL) slot structure in a wireless communication system.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Also, technique, device, system, which will be described hereinafter, may be applied to various wireless multiplexing access systems. For convenience of description, it is assumed that the present invention is applied to a 3GPP LTE(-A). However, it is to be understood that technical features of the present invention are limited to the 3GPP LTE(-A). For example, although the following description will be made based on a mobile communication system corresponding to a 3GPP LTE(-A) system, the following description may be applied to other random mobile communication system except matters specific to the 3GPP LTE(-A).

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) may be fixed or may have mobility, and various equipments, which transmit and receive user data and/or various kinds of control information to and from a base station (BS) by performing communication with the base station BS, belong to the user equipment UE. The user equipment UE may be referred to as a Terminal Equipment, a Mobile Station (MS), a Mobile Terminal (MT), a User Terminal (UT), a Subscribe Station (SS), a wireless device, a Personal Digital Assistant (PDA), a wireless modem, a handheld device, etc. Also, in the present invention, the base station (BS) generally means a fixed station that performs communication with the UE and/or another BS, and exchanges various data and control information with the BS by performing communication with the BS. The BS may be referred to as an Advanced Base Station (ABS), a Node-B (NB), an evolved-NodeB (eNB), a Base Transceiver System (BTS), an Access Point, a Processing Server (PS), etc.

In the present invention, Physical Downlink Control Channel (PDCCH)/Physical Control Format Indicator Channel (PCFICH)/Physical Hybrid automatic retransmit request Indicator Channel (PHICH)/Physical Downlink Shared Channel (PDSCH) respectively mean a set of time-frequency resources or a set of resource elements, which carry Downlink Control Information (DCI)/Control Format Indicator (CFI)/downlink ACK/NACK (ACKnowlegement/Negative ACK)/downlink data. Also, Physical Uplink Control Channel (PUCCH)/Physical Uplink Shared Channel (PUSCH) respectively mean a set of time-frequency resources or a set of resource elements, which carry Uplink Control Information (UCI)/uplink data. In the present invention, time-frequency resources or resource elements (REs) allocated to or belonging to the PDCCH/PCFICH/PHICH/PDSCH/PUCCH/PUSCH will be referred to as PDCCH/PCFICH/PHICH/PDSCH/PUCCH/PUSCH REs or PDCCH/PCFICH/PHICH/PDSCH/PUCCH/PUSCH resources, respectively. Accordingly, in the present invention, PUCCH/PUSCH transmission from the user equipment may mean transmission of uplink control information/uplink data/random access signal on the PUSCH/PUCCH, respectively. Also, in the present invention, PDCCH/PCFICH/PHICH/PDSCH transmission from the BS may mean transmission of downlink data/control information on the PDCCH/PCFICH/PHICH/PDSCH, respectively.

Also, in the present invention, Cell-specific Reference Signal (CRS)/Demodulation Reference Signal (DMRS)/Channel State Information Reference Signal (CSI-RS) time-frequency resources (or REs) respectively mean REs that may be allocated or used for CRS/DMRS/CSI-RS, or time-frequency resources (or REs) carrying CRS/DMRS/CSI-RS. Also, subcarriers that include CRS/DMRS/CSI-RS RE may be referred to as CRS/DMRS/CSI-RS subcarriers, and OFDM symbols that include CRS/DMRS/CSI-RS RE may be referred to as CRS/DMRS/CSI-RS symbols. Also, in the present invention, SRS time-frequency resources (or REs) may mean time-frequency resources (or REs) transmitted from the user equipment to the base station to allow the base station to carry a sounding reference signal (SRS) used for measurement of an uplink channel status formed between the user equipment and the base station. The reference signal (RS) means a signal of a special waveform previously defined and known well by the user equipment and the base station, and may be referred to as a pilot.

In the meantime, in the present invention, a cell means a localized area where one BS, node(s) or antenna port(s) provides a communication service. Accordingly, in the present invention, communication with a specific cell may mean communication with a BS, node, or antenna port, which provides a communication service to the specific cell. Also, downlink/uplink signals of the specific ell mean downlink/uplink signals to a BS, node or antenna port, which provides a communication service to the specific cell. Moreover, channel status/quality of the specific cell means channel status/quality of a channel or communication link formed between the BS, node or antenna port, which provides a communication service to the specific cell, and the UE.

FIG. 1 is a diagram illustrating an example of a structure of a radio frame used in a wireless communication system. In particular, FIG. 1(a) illustrates a structure of a radio frame that may be used for FDD in a 3GP LTE(-A), and FIG. 1(b) illustrates a structure of a radio frame that may be used for TDD in a 3GPP LTE(-A).

Referring to FIG. 1, the radio frame used in the 3GPP LTE(-A) has a length of 10 ms ($307200T_s$) and includes ten (10) subframes of an equal size. Each number may be given to the ten subframes within one radio frame. In this case, $T_s$ represents a sampling time, and is expressed by $T_s=1/(2048*15$ kHz). Each subframe has a length of 1 ms and includes two slots. 20 slots within one radio frame may sequentially be numbered from 0 to 19. Each slot has a length of 0.5 ms. The time for transmitting one subframe is defined by a transmission time interval (TTI). A time resource may be identified by a radio frame number (or radio frame index), a subframe number (or subframe index), a slot number (or slot index), etc.

The radio frame may be configured differently depending on a duplex mode. For example, since downlink (DL) transmission and uplink (UL) transmission are identified by frequency in an FDD mode, the radio frame includes only one of a downlink subframe and an uplink (UL) subframe for a predetermined frequency band operated at a predetermined carrier frequency. Since DL transmission and UL transmission are identified by time in a TDD mode, the radio frame includes both a downlink subframe and an uplink (UL) subframe for a predetermined frequency band operated at a predetermined carrier frequency.

Table 1 illustrates DL-UL configuration of subframes within a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D represents a downlink subframe, and U represents a UL subframe, and S represents a special subframe. In particular, the subframe includes three fields of a Downlink Pilot TimeSlot (DwPTS), a Guard Period (GP), and an Uplink Pilot TimeSlot (UpPTS). The DwPTS is a time interval reserved for DL transmission, and the UpPTS is a time interval reserved for UL transmission.

FIG. 2 is a diagram illustrating an example of downlink/uplink (DL/UL) slot structures in a wireless communication system. In particular, FIG. 2 illustrates a structure of a resource grid in a 3GPP LTE(-A) system. One resource grid is provided per antenna port.

The slot includes a plurality of orthogonal frequency division multiplexing (OFDM) symbols in a time domain, and includes a plurality of resource blocks (RBs) in a frequency domain. The OFDM symbols may mean one symbol interval. Referring to FIG. 2, a signal transmitted from each slot may be expressed by a resource grid, which includes $N^{DL/UL}_{RB}*N^{RB}_{sc}$ number of subcarriers and $N^{DL/UL}_{symb}$ number of OFDM symbols. In this case, $N^{DL}_{RB}$ represents the number of resource blocks (RBs) in the downlink slot, $N^{UL}_{RB}$ represents the number of resource blocks in the UL slot. $N^{DL}_{RB}$ and $N^{UL}_{RB}$ respectively depend on DL transmission bandwidth and UL transmission bandwidth. $N^{DL}_{symb}$ represents the number of OFDM symbols within the downlink slot. $N^{UL}_{symb}$ represents the number of OFDM symbols within the UL slot. $N^{RB}_{sc}$ represents the number of subcarriers constituting one RB.

The OFDM symbols may be referred to as SC-FDM symbols depending on multiplexing access schemes. Various modifications may be made in the number of OFDM symbols included in one slot depending on channel bandwidth and CP length. For example, one slot includes seven OFDM symbols in case of normal CP but one slot includes six OFDM symbols in case of extended CP. Although FIG. 2 illustrates subframes that one slot includes seven OFDM symbols for convenience of description, the embodiments of the present invention may likewise be applied to subframes having another number of OFDM symbols not seven OFDM symbols. Referring to FIG. 2, each OFDM symbol includes $N^{DL/UL}_{RB}*N^{RB}_{sc}$ number of subcarriers in the frequency domain. A type of subcarriers may be divided into data subcarriers for data transmission, reference signal subcarriers for transmission of reference signals, and null subcarriers for guard band and DC components. The null subcarriers for DC components are the subcarriers reserved as non-use, and are mapped into carrier frequency $f_0$ during OFDM signal generating process or frequency uplink conversion process. The carrier frequency may be referred to as center frequency.

One RB is defined by $N^{DL/UL}_{symb}$ number of continuous OFDM symbols in the time domain and $N^{RB}_{sc}$ number of continuous subcarriers (for example, 12 subcarriers) in the frequency domain. For reference, a resource configured by one OFDM symbol and one subcarrier will be referred to as a resource element (RE) or tone. Accordingly, one RB is configured by $N^{DL/UL}_{symb}*N^{RB}_{sc}$ number of resource elements. Each resource element within the resource grid may uniquely be defined by a pair of indexes (k,l) within one slot. In this case, k is an index given from 0 to $N^{DL/UL}_{RB}*N^{RB}_{sc}-1$ in the frequency domain, and l is an index given from 0 to $N^{DL/UL}_{symb}-1$ in the time domain.

Two RBs, which occupy $N^{RB}_{sc}$ number of same continuous subcarriers for one subframe and are respectively located at two slots of the subframe, will be referred to as a pair of physical resource blocks (PRB). The two RBs constituting the PRB have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N^{DL}_{VRB}-1$, and $N^{DL}_{VRB}=N^{DL}_{RB}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

FIG. 3 is a diagram illustrating a structure of a downlink frame.

Referring to FIG. 3, the downlink subframe includes a control region carrying a control channel and a data region carrying a traffic channel. The control region starts from the first OFDMA symbol of the subframe, and includes one or more OFDMA symbols. The size of the control region may be set independently per subframe. The control region includes a Physical Control Format Indicator Channel (PCIFIC), a Physical Hybrid ARQ Indicator Channel (PHICH), and a Physical Downlink Control Channel (PDCCH). The data region includes a Physical Downlink Shared Channel (PDSCH).

The control region for the PDCCH includes logical control channel element (CCE) columns that include a plurality of CCEs. Hereinafter, the control region for the PDCCH will simply be referred to as the control region unless mentioned otherwise. Also, the CCE columns will be referred to as aggregation of full CCEs constituting the control region within one subframe. The CCEs correspond to a plurality of resource element groups (REG). The resource element groups are used to define mapping of the control channel into the resource elements. The REs are defined by one subcarrier and one OFDMA symbol. FIG. 4 illustrates a resource unit constituting the control region. Referring to FIG. 4, the REGs (solid box) may correspond to four neighboring REs except reference signals R0 to R3, and the CCEs may correspond to nine REGs.

A plurality of PDCCHs may be transmitted within the control region. The PDCCH carries various kinds of downlink control information (for example, scheduling information). The PDCCH is transmitted onto aggregation of one or more continuous control channel elements (CCEs). The format of the PDCCH and the number of available bits of the PDCCH are determined depending on the number of CCEs constituting CCE aggregation. Hereinafter, the number of CCEs used for PDCCH transmission will be referred to as a CCE aggregation level. Also, the CCE aggregation level is a CCE unit for searching for the PDCCH. The size of the CCE aggregation level is defined by the number of neighboring CCEs. For example, the CCE aggregation level may be element of {1, 2, 4, 8}.

Table 2 illustrates the format of the PDCCH and bits of the PDCCH based on the CCE aggregation level.

TABLE 2

| PDCCH format | Number of CCEs | Number of resource-element groups | number of PDCCH bit |
|---|---|---|---|
| 0 | 1 | 9 | 72 |
| 1 | 2 | 18 | 144 |
| 2 | 4 | 36 | 288 |
| 3 | 8 | 72 | 576 |

The control information transmitted through the PDCCH will be referred to as downlink control information (DCI). The DCI includes uplink scheduling information, downlink scheduling information, system information, uplink power control command, control information for paging, and control information indicating random access channel (RACH) response. Also, the DCI may include control information for indicating activation of semi-persistent scheduling (SPS). The DCI may include control information for indicating inactivation of semi-persistent scheduling. Semi-persistent scheduling may be used for uplink or downlink voice over Internet protocol (VoIP) transmission.

Examples of the DCI format include a format 0 for Physical Uplink Shared Channel (PUSCH) scheduling, a format 1 for scheduling of one Physical Downlink Shared channel (PDSCH) codeword, a format 1A for compact scheduling of one PDSCH codeword, a format 1B for scheduling for rank-1 transmission of a single codeword in a spatial multiplexing mode, a format 1C for very simple scheduling of a Downlink Shared Channel (DL-SCH), a format 1D for PDSCH scheduling in a multi-user spatial multiplexing mode, a format 2 for PDSCH scheduling a closed-loop spatial multiplexing mode, a format 2A for PDSCH scheduling in an open-loop spatial multiplexing mode, and formats 3 and 3A for transmission of a transmission power control (TPC) command for an uplink channel.

Figure 5:
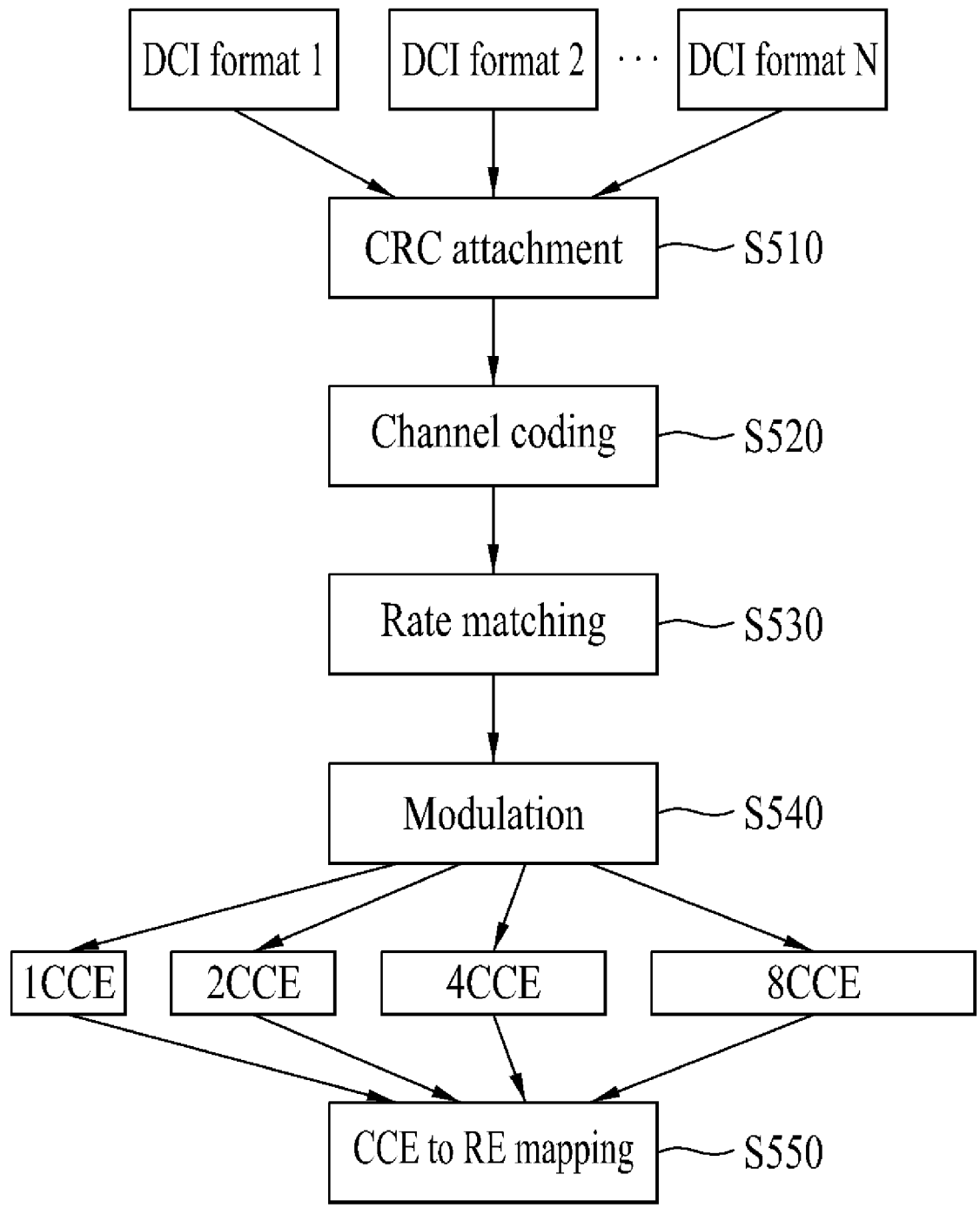
FIG. 5 is a flow chart illustrating PDCCH configuration of a base station.

FIG. 5 is a flow chart illustrating PDCCH configuration of a base station.

Referring to FIG. 5, the base station generates control information in accordance with the DCI format. The base station may select one of a plurality of DCI formats (DCI format 1, 2, . . . , N) in accordance with control information to be transmitted to the UE. At step S510, the base station attaches cyclic redundancy check (CRC) for error detection to the control information generated in accordance with each DCI format. The CRC is masked with an identifier (for example, radio network temporary identifier (RNTI)) depending on owner or usage of the PDCCH.

If the PDCCH is for a specific user equipment, a unique identifier (for example, cell-RNTI (C-RNTI)) of the corresponding user equipment may be masked with the CRC. In other words, the CRC may be scrambled with the unique identifier of the UE. Examples of the RNTI for the specific UE include temporary C-RNTI and semi-persistent C-RNTI. The temporary C-RNTI may be used for random access process as the temporary identifier of the UE. The semi-persistent C-RNTI may be used to indicate semi-persistent scheduling activation. Alternatively, if the PDCCH is for a paging message, a paging identifier, for example, Paging-RNTI (P-RNTI) may be masked with the CRC. If the PDCCH is for system information transmitted through the DL-SCH, system information identifier, for example, system information RNTI (SI-RNTI) may be masked with the CRC. If the PDCCH is for a random access response, which is a response to transmission of a random access preamble of the UE, a random access RNTI (RA-RNTI) may be masked with the CRC.

Table 3 illustrates an example of identifiers masked with the PDCCH.

TABLE 3

| Type | Identifier | Description |
|---|---|---|
| UE-specific | C-RNTI, temporary C-RNTI, semi-persistent C-RNTI | used for a unique UE identification |
| Common | P-RNTI | used for paging message |
|  | SI-RNTI | used for system information |
|  | RA-RNTI | used for random access response |

If C-RNTI, temporary C-RNTI or semi-persistent C-RNTI is used, the PDCCH carries the control information for the specific UE. If the other RNTI is used, the PDCCH carries common control information received by all the UEs within the cell. At step S520, channel coding is performed for the control information with CRC, whereby coded data are generated. At step S530, rate matching based on the CCE aggregation level allocated to the PDCCH format is performed. At step S540, the coded data are modulated to generate modulated symbols. The modulated symbols constituting one PDCCH may have CCE aggregation level of 1, 2, 4, or 8. At step S550, the modulated symbols are mapped into physical resource elements (Res) (CCE to RE mapping).

Figure 6:
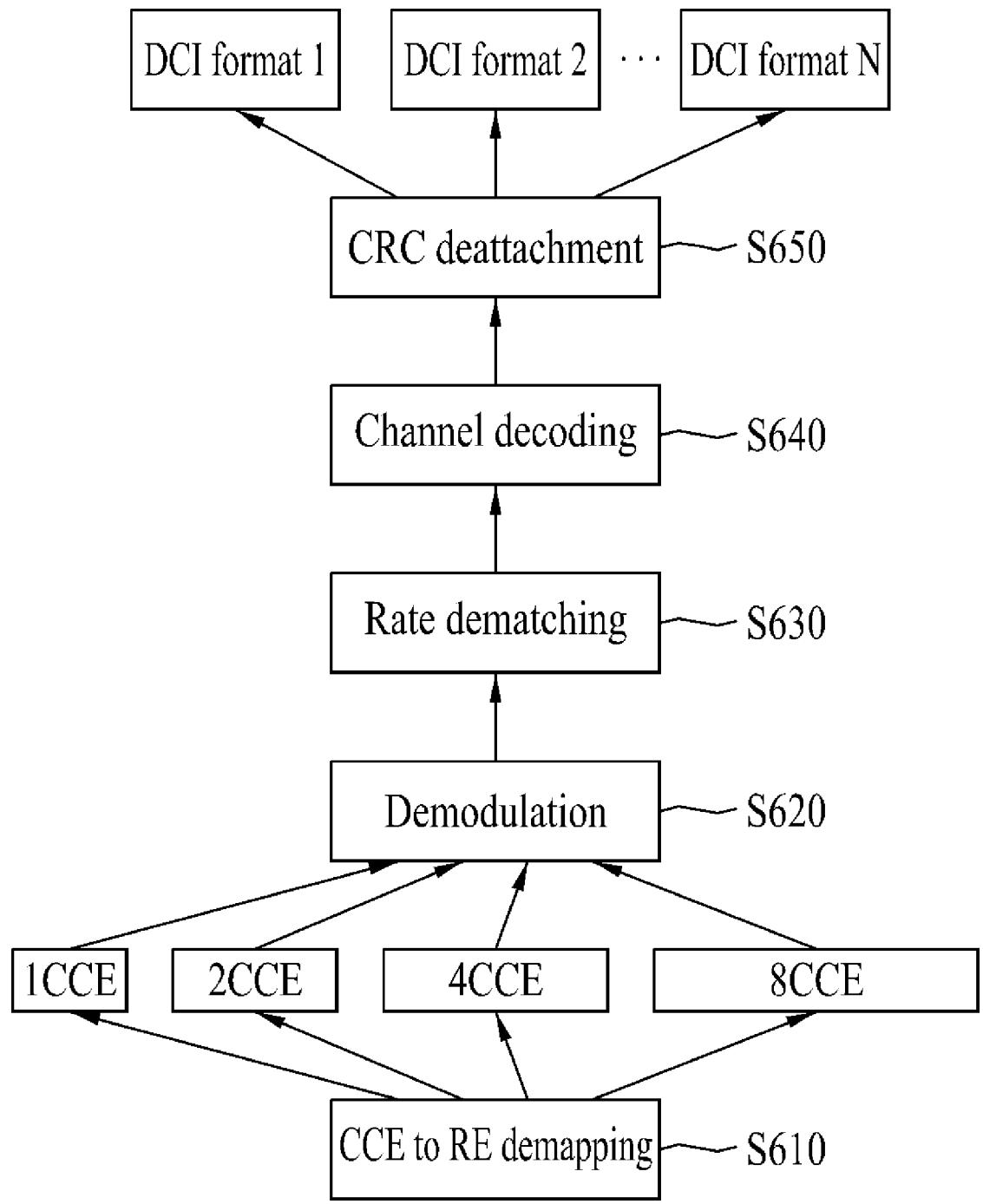
FIG. 6 is a flow chart illustrating PDCCH processing of a UE.

FIG. 6 is a flow chart illustrating PDCCH processing of a UE.

Referring to FIG. 6, the UE performs demapping of physical resource elements into CCEs (CCE to RE mapping) at step S610. At step S620, since the UE does not know what CCE aggregation level should be used to receive the PDCCH, it performs demodulation for each CCE aggregation level. At step S630, the UE performs rate dematching for the demodulated data. Since the UE does not know what DCI format of control information should be received therein, it performs rate dematching for each DCI format. At step S640, the UE performs channel decoding for the rate dematched data in accordance with a code rate, and detects whether an error has occurred, by checking CRC. If an error has not occurred, the UE will detect its PDCCH. If the error has occurred, the UE continues to perform blind decoding for the other CCE aggregation level or the other DCI format. At step S650, the UE that has detected its PDCCH removes CRC from the decoded data and acquires control information.

A plurality of PDCCHs for a plurality of UEs may be transmitted with the control region of the same subframe. The base station does not provide the UE with information on where the corresponding PDCCH is located within the control region. Accordingly, the UE searches for its PDCCH by monitoring a set of PDCCH candidates within the subframe. In this case, monitoring means that the UE attempts decoding for the received PDCCHs in accordance with each DCI format. This will be referred to as blind decoding. The UE simultaneously performs identifying of the PDCCH transmitted thereto and decoding of the control information transmitted through the corresponding PDCCH through the blind decoding. For example, if the PDCCH is demasked with the C-RNTI and there is no error in CRC, the UE detects its PDCCH.

In the 3GPP LTE(-A), in order to reduce load due to blind decoding, a search space is used. The search space may be referred to as a monitoring set of CCEs for the PDCCH. The UE monitors the PDCCH within the corresponding search space. The search space is divided into a common search space and a UE-specific search space. The common search space is to search for the PDCCH having common control information, includes 16 CCEs of 0 to 15 CCE indexes, and supports the PDCCH having a CCE aggregation level of $\{4, 8\}$. However, the PDCCH (DCI formats 0 and 1A) carrying the UE-specific information may be transmitted in the common search space. The UE-specific search space supports the PDCCH having a CCE aggregation level of $\{1, 2, 4, 8\}$.

The following Table 4 illustrates the number of PDCCH candidates monitored by the UE.

TABLE 4

| | Search Space $S_k^{(L)}$ | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

The size of the search space is determined by Table 4 above, and a start point of the search space is defined in such a manner that the start point of the common search space is different from that of the UE-specific search space. Although the start point of the common search space is fixed regardless of the subframe, the start point of the UE-specific search space may be varied per subframe depending on UE identifier (for example, C-RNTI), CCE aggregation level and/or a slot number within the radio frame. If the start point of the UE-specific search space is within the common search space, the UE-specific search space may be overlapped with the common search space.

In the aggregation level $L \in \{1,2,4,8\}$, the search space $S_k^{(L)}$ is defined by a set of the PDCCH candidates. The CCE corresponding to the PDCCH candidate m of the search space $S_k^{(L)}$ is given as follows.

MathFigure 1

$$L\{(Y_k+m') \bmod \lfloor N_{CCE,k}/L \rfloor\}+i \qquad [\text{Math.1}]$$

In this case, $i=0, 1, \ldots, L-1, m=0, \ldots, M^{(L)}-1$, $N_{CCE,k}$ is a total number of CCEs that may be used for PDCCH transmission within the control region of the subframe k. The control region includes a set of CCEs numbered from 0 to $N_{CCE,k}-1$. $M^{(L)}$ is the number of PDCCH candidates at the CCE aggregation level L of the given search space. At the common search space, $Y_k$ is set to 0 for two aggregation levels, L=4 and L=8. At the UE-specific search space of the aggregation level L, the parameter $Y_k$ is defined as follows.

MathFigure 2

$$Y_k = (A \cdot Y_{k-1}) \bmod D \qquad [\text{Math.2}]$$

In this case, $Y_{-1} = n_{RNTI} \neq 0$, A=39827, D=65537, $$k = \lfloor n_s/2 \rfloor,$$

and $n_s$ is a slot number within the radio frame.

Figure 7:
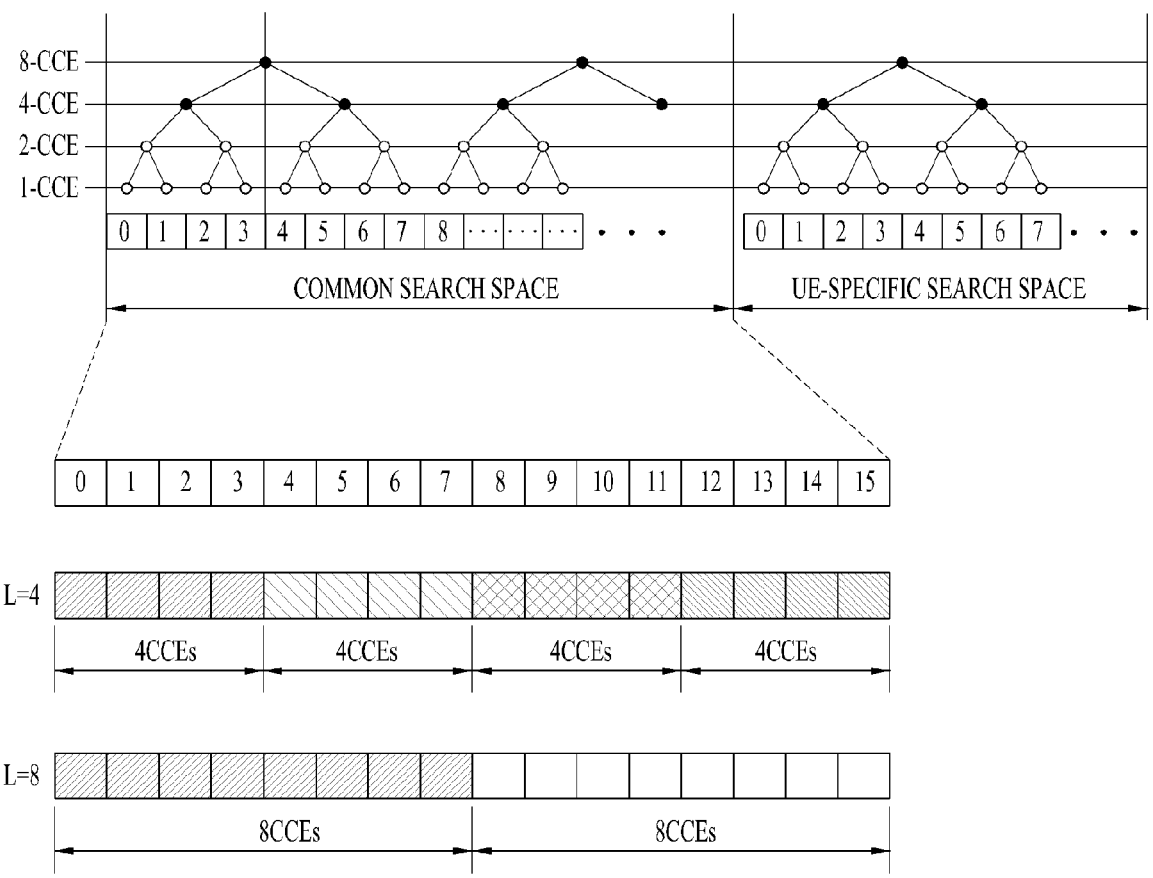
FIG. 7 is a diagram illustrating monitoring of a PDCCH.

FIG. 7 is a diagram illustrating monitoring of a PDCCH. In more detail, FIG. 7 illustrates an example of a common search space of a search space of a PDCCH. As described in Table 4, the common search space is illustrated. The UE-specific search space has different sizes depending on an aggregation level as described in Table 4. The UE may detect a PDCCH intended for itself by performing blind decoding per aggregation level at a specific subframe as described with reference to FIG. 6.

In the meantime, the introduction of remote radio head (RRH) has newly been discussed to improve system throughput. Also, since a plurality of serving component carriers (CCs) may be configured for one UE under carrier aggregation, a method for transmitting UL/DL grants for other CC from a serving CC having good channel status has been discussed. If a CC carrying scheduling information, that is, UL/DL grants is different from a CC through which UL/DL transmission corresponding to the UL/DL grants is performed, it will be referred to as cross-carrier scheduling. If the RRH technology and the cross-carrier scheduling technology are introduced, the amount of the PDCCH to be transmitted from the BS is gradually increased. However, the size of the control region to which the PDCCH may be transmitted is the same as that of the related art, PDCCH transmission acts as bottleneck of system throughput. Accordingly, in order to prevent the PDCCH transmission from restricting system throughput, PDCCH transmission based on PDSCH region of the DL subframe has been discussed. The PDCCH based on the existing 3GPP LTE standard may be allocated to the PDCCH region of the DL subframe. Meanwhile, the PDCCH may additionally be allocated using some resource of the PDSCH region. If the PDCCH is transmitted from the PDSCH region, this PDCCH may be used for CRS based transmission diversity or spatial multiplexing transmission and may be operated based on DMRS which is a UE-specific reference signal. Hereinafter, in order to identify the PDCCH, which is transmitted from rear OFDM symbols (PDSCH region) of the DL subframe, from the existing PDCCH transmitted from front OFDM symbols (PDSCH region) of the DL subframe, the former PDCCH will be referred to as an enhanced PDCCH (E-PDCCH) or an advanced PDCCH (A-PDCCH). The PDSCH/PUSCH scheduled by the E-PDCCH may be referred to as E-PDSCH/E-PUSCH. The PDCCH and the E-PDCCH may be managed by their respective CCE indexes different from each other. In this case, even though the PDCCH and the E-PDCCH are transmitted on the CCE having the same CCE index, the CCE of the PDCCH and the CCE of the E-PDCCH may mean different CCEs.

Figure 8:
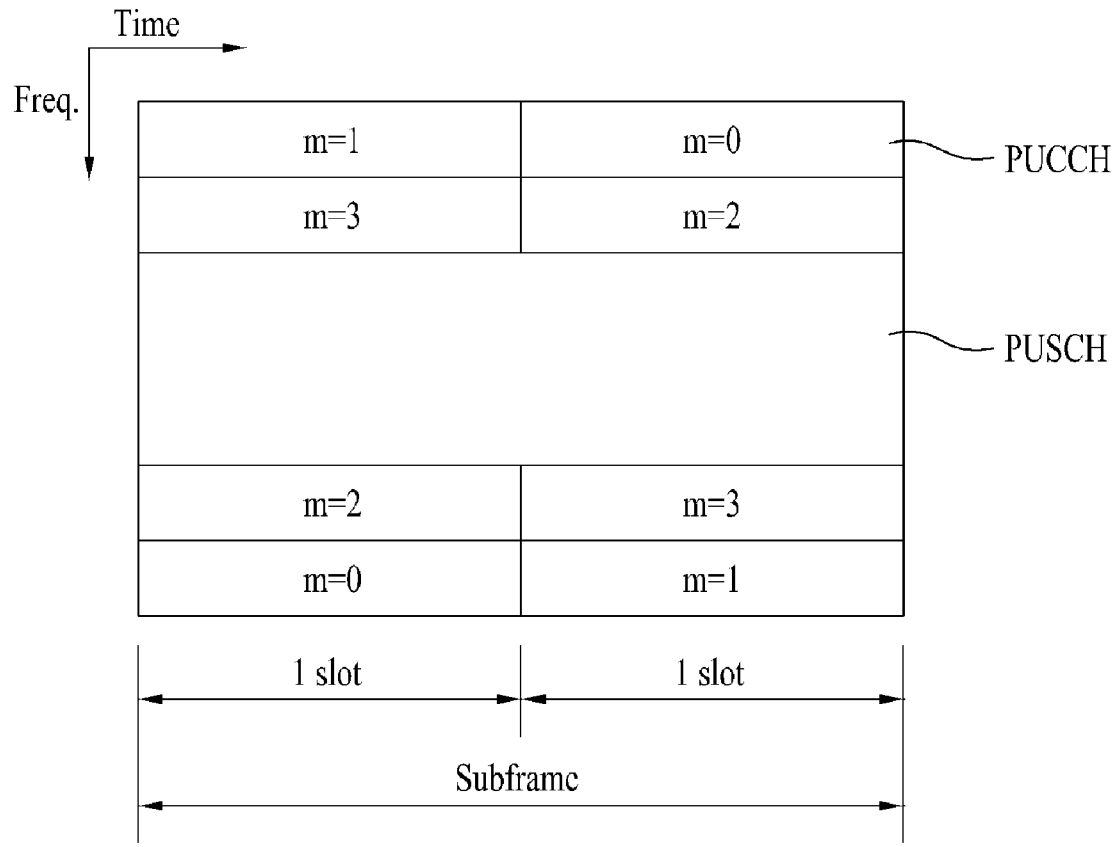
FIG. 8 is a diagram illustrating a structure of an uplink subframe used in an LTE.

FIG. 8 is a diagram illustrating a structure of an uplink subframe used in an LTE(-A).

Referring to FIG. 8, the uplink subframe includes a plurality of slots (for example, two slots). The respective slots may include their respective SC-FDMA symbols different from those of the other slot in accordance with a CP length. For example, in case of normal CP, the slot may include seven SC-FDMA symbols. The uplink subframe may be divided into a control region and a data region in a frequency domain. The data region includes a PUSCH and is used to transmit a data signal such as voice. The control region includes a PUCCH and is used to transmit control information. The PUCCH includes RB pair (for example, m=0, 1, 2, 3) located at both ends of the data region on a frequency axis, and performs hopping on the border of the slots. The control information includes HARQ ACK/NACK, channel quality information (CQI), a precoding matrix indicator (PMI), a rank indicator (RI), etc.

Figure 9:
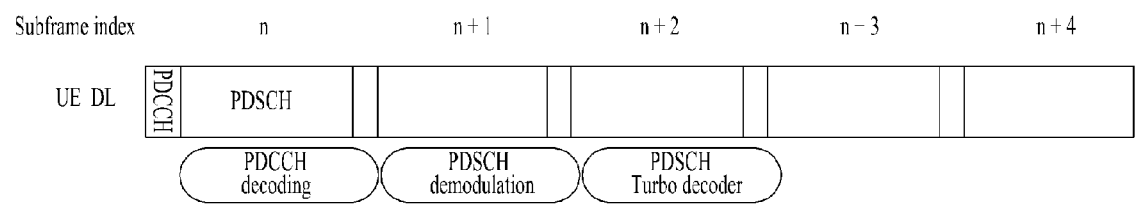
FIG. 9 and FIG. 10 are diagrams illustrating an operation of a UE, which is related to reception of a PDCCH and an E-PDCCH according to one embodiment of the present invention.
Figure 10:
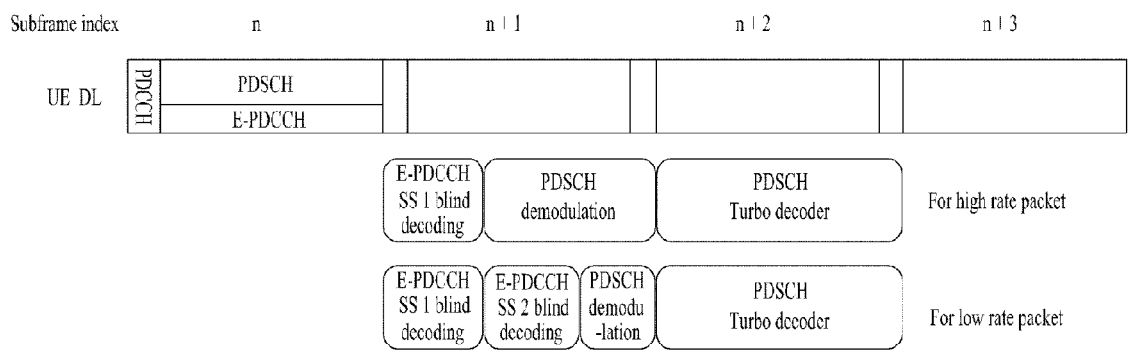

FIG. 9 and FIG. 10 are diagrams illustrating an operation of a UE, which is related to reception of a PDCCH and an E-PDCCH according to one embodiment of the present invention. FIG. 10 illustrates a procedure of receiving a PDCCH and processing the received PDCCH in a 3GPP LTE system. In the 3GPP LTE system, the PDCCH is transmitted over first N (1 to 4) number of OFDM symbols of each subframe. Accordingly, the UE may perform blind decoding for the PDCCH after receiving the first N number of OFDM symbols of the subframe, and may receive the PDSCH transmitted thereto on the basis of the downlink scheduling control information obtained as a result of blind decoding. Referring to FIG. 9, the UE may detect the PDSCH transmitted thereto by performing blind decoding for the PDCCH after completely receiving the PDCCH, and may perform modulation and decoding for the detected PDSCH.

In the meantime, in case of the E-PDCCH, TDM+FDM scheme where the E-PDCCH is transmitted over the first slot of each subframe, or FDM scheme where the E-PDCCH is transmitted over the entire of each subframe is considered. In case of the FDM scheme, since decoding for the E-PDCCH is performed (see top of FIG. 10) after all the OFDM symbols of the corresponding subframe are received, that is, since the E-PDCCH is transmitted from a portion of frequency band of one subframe, the time for control information decoding and data decoding is reduced as compared with the existing LTE system. Accordingly, if the search space size for the E-PDCCH is maintained in the same manner as the LTE system, complexity for E-PDCCH decoding and corresponding PDSCH demodulation and decoding is increased.

To this end, in the present invention, the search space allocated to the corresponding UE may be divided into a plurality of search spaces, and order of priority may be allocated or given to each divided search space (hereinafter, referred to as "sub-search space"). In this case, one sub-search space includes at least one PDCCH. Order of priority given to each sub-search space determines order of blind decoding, and the UE is configured to perform decoding the sub-search space with high priority prior to the sub-search space with low priority. In the meantime, in the embodiment of the present invention, it is assumed that the UE knows order of priority for the sub-search space. However, order of priority on information for the sub-search space may be transmitted to the UE through the upper layer signal such as RRC.

Referring to FIG. 10, the UE may perform blind decoding for the first sub-search space SS1 with the highest priority. If this blind decoding is successfully performed, the UE may start demodulation of the PDSCH immediately or after a predetermined time period passes, and then may perform PDSCH decoding. However, if the blind decoding for the first sub-search space SS1 is not performed successfully, the UE may perform blind decoding for the second sub-search space SS2 with next priority. If the blind decoding for the second sub-space SS2 is successfully performed, the UE may start demodulation for the PDSCH and then may perform channel decoding for the PDSCH. FIG. 10 illustrates these two cases, and as will be apparent from the embodiment of the present invention, which will be described later, the former case is the example that data corresponding to a high transmission rate are transmitted through the PDSCH, and the latter case is the example that data corresponding to a low transmission rate are transmitted through the PDSCH.

For efficiency of the wireless communication system according to the embodiment of the present invention, control information transmitted through the sub-search space with higher priority or lower priority may be determined in accordance with specific requirements. Hereinafter, the specific requirements for determining the control information transmitted in accordance with the order of priority will be described.

If a transmission data rate of the PDSCH designated by the control information or a payload size of the transmission data is more than a predetermined value, the corresponding control information may be configured to be transmitted through only the search space with higher priority. The high transmission data rate of the PDSCH means that the size of the search space, which may control the corresponding control information, is reduced. If the transmission data rate of the PDSCH is high, much more resource blocks are allocated. Thus, the number of UEs simultaneously scheduled for the corresponding subframe is reduced, whereby search space collision between the UEs is not serious. Accordingly, it is expected that there is no problem in scheduling transmission of the control information to the corresponding UE by using the reduced search spaces only.

Also, the BS may be configured to transmit the corresponding control information through only the search space with higher priority if a transmission modulation scheme of the PDSCH designated by the control information is more than a predetermined level. This is to provide the UE with the enough time for demodulation with respect to the modulation scheme where much time is required for demodulation. Also, if the number of resource blocks allocated to the PDSCH designated by the control information is more than a predetermined number of resource blocks, the BS may be configured to transmit the corresponding control information through only the search space with higher priority. In other words, the BS may determine features (transmission data rate, payload size of transmission data, transmission modulation scheme, the number of resource blocks, etc.) of the PDSCH (or data to be transmitted through the PDSCH) intended for the specific UE and order of priority assigned to the search space.

For example, if the corresponding UE performs blind decoding from the high priority to the low priority in accordance with the order of the sub-search space and detects a downlink scheduling message intended for the corresponding UE at the nth blind decoding, the number of resource blocks allocated to the PDSCH designated by the downlink scheduling message may be designed to be smaller than f(n) determined by the n. In this case, f(n) is a function of which value is reduced in accordance with n but is not necessarily a function of a inverse proportion relation and may be a step function, for example. In other words, if the control information on the corresponding UE is allocated to the sub-search space with relatively lower priority, the PDSCH for the corresponding UE means that a transmission data rate, a payload size of transmission data, and a transmission modulation scheme are relatively low. The BS gives priority of the sub-search space for the corresponding UE by considering features of the PDSCH for such a UE.

Also, if the E-PDCCH and the PDSCH are transmitted based on a UE-specific DM-RS, to maintain the number of channel estimation times based on the DM-RS, candidate regions of the search space to be scanned may be limited to g(m) number of sub-search spaces with higher priority to perform blind decoding for the E-PDCCH when the number of resource blocks allocated for the PDSCH is m. In this case, the downlink scheduling message and an uplink grant message should exist within this limited candidate regions.

Also, in the present invention, the uplink control information that grants uplink data transmission may be transmitted through all the search spaces regardless of priority of the search space. However, even though blind decoding for the E-PDCCH is successfully performed in the aforementioned embodiment of the present invention, blind decoding for the other sub-search space should be performed to detect control information on the uplink intended for the UE. In other words, the time reduction effect for blind decoding of the UE may be lowered. In order to improve this, the BS may be configured to transmit the control information on the uplink through the sub-search space with high priority. For example, the BS may be configured to transmit downlink control information and uplink control information through one sub-search space comprised of at least two PDCCHs, or may be configured to respectively transmit uplink control information and downlink control information to the sub-search space of the same priority or two sub-search spaces having subsequent priorities. Also, there may be considered a method for indicating whether uplink control information transmitted to the UE exists in the sub-search space with low priority by adding a field to downlink control information (for example, downlink scheduling message) on one UE, which is transmitted through the sub-search space with high priority.

Also, when the BS divides the search space allocated to the UE into a plurality of sub-search spaces and gives order of priority to the divided search spaces, although the respective sub-search spaces may have the same number of candidate regions for each of aggregation levels, more candidate regions having a low aggregation level (for example, L=1) may be allocated as high priority and more candidate regions having a high aggregation level (for example, L=8) may be allocated as low priority. Also, the candidate region corresponding to the common search space may be included in the sub-search space corresponding to lower priority.

Figure 11:
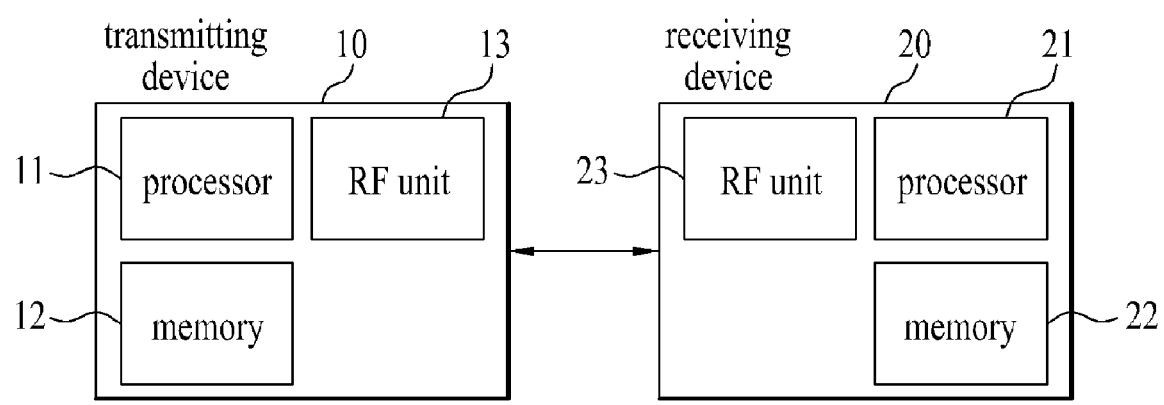
FIG. 11 is a block diagram illustrating elements of a transmitting device 10 and a receiving device 20 configured to perform one embodiment of the present invention.

FIG. 11 is a block diagram illustrating elements of a transmitting device 10 and a receiving device 20 configured to perform one embodiment of the present invention.

The transmitting device 10 and the receiving device 20 respectively include a radio frequency (RF) unit 13, 23 for transmitting or receiving a radio signal carrying information and/or data, signal or message, a memory 12, 22 storing various kinds of information related to communication within a wireless communication system, and a processor 11, 21 connected with the RF unit 13, 23 and the memory 12, 22 and configured to control the memory 12, 22 and/or the RF unit 13, 23 to allow the corresponding apparatus to perform at least one of the aforementioned embodiments of the present invention.

The memory 12, 22 may store a program for processing and control of the processor 11, 21 and temporarily store input/output information. The memory 12, 22 may be used as a buffer.

The processor 11, 21 generally controls the overall operation of various modules of the transmitting device or the receiving device. In particular, the processor 11, 21 may perform a controller function for implementing the aforementioned embodiments of the present invention. The processor 11, 21 may be referred to as a controller, a microcontroller, a microprocessor, and a microcomputer. The processor 11, 21 may be implemented by hardware, firmware, software, or their combination. If the present invention is implemented by hardware, application specific integrated circuits (ASICs), digital signal processors (DSPs), digital signal processing devices (DSPDs), programmable logic devices (PLDs), and field programmable gate arrays (FPGAs), which are configured to perform the present invention, may be provided in the processor 11, 21. Meanwhile, if the present invention is implemented by firmware or software, the firmware or software may be configured to include a module, a procedure, or a function, which performs functions or operations of the present invention. The firmware or software configured to perform the present invention may be provided in the processor 11, 21 or may be stored in the memory 12, 22 and then may be driven by the processor 11, 21.

The processor 11 of the transmitting device 10 performs predetermined coding and modulation for a signal and/or data scheduled from the processor 11 or a scheduler connected with the processor 11 and transmitted to the outside, and then the coded and modulated data to the RF unit 13. For example, the processor 11 converts desired data streams into K number of layers through demultiplexing, channel coding, scrambling, modulation, etc. The coded data streams may be referred to as codewords, and are equivalent to transport blocks which are data blocks provided by a medium access control (MAC) layer. One transport block (TB) is coded into one codeword, wherein each codeword is transmitted to the receiving device in a type of one or more layers. For frequency uplink conversion, the RF unit 13 may include an oscillator. The RF unit 13 may include Nt number (Nt is a positive integer) of transmitting antennas.

A signal processing procedure of the receiving device 20 is configured by an inverse procedure of the signal processing procedure of the transmitting device 10. Under the control of the processor 21, the RF unit 23 of the receiving device 20 receives a radio signal transmitted by the transmitting device 10. The RF unit 23 may include Nr (Nr is a positive integer) number of receiving antennas. The RF unit 23 frequency down-coverts each of the signals received through the receiving antennas to recover baseband signals. The RF unit 23 may include an oscillator for frequency down-conversion. The processor 21 may perform decoding and demodulation for the radio signals received through the receiving antennas to recover data originally intended to be transmitted from the transmitting device 10.

The RF unit 13, 23 includes one or more antennas. The antennas may transmit the signals processed by the RF unit 13, 23 to the outside or receive the radio signals from the outside and transfer the radio signals to the RF unit 13, 23 under the control of the processor 11, 21 in accordance with one embodiment of the present invention. The antennas may be referred to as antenna ports. Each antenna may correspond to one physical antenna or may be configured by combination of physical antenna elements more than one. The signal transmitted from each antenna cannot be decomposed any more by the receiving device 20. The reference signal (RS) transmitted to correspond to the corresponding antenna defines the corresponding antenna in view of the receiving device 20, and allows the receiving device 20 to perform channel estimation for the antenna regardless of the fact that the channel is a single radio channel from one physical antenna or a composite channel from a plurality of physical antenna elements including the above antenna. In other words, the antenna is defined such that a channel transferring symbols on the antenna may be obtained from the channel to which other symbols on the same antenna are transferred. The RF unit that supports a multi-input multi-output (MIMO) function for transmitting and receiving data using a plurality of antennas may be connected with two or more antennas.

In the embodiments of the present invention, the UE or relay is operated as the transmitting device 10 on the uplink and as the receiving device 20 on the downlink. In the embodiments of the present invention, the BS is operated as the receiving device 20 on the uplink and as the transmitting device 10 on the downlink.

Hereinafter, for description of the embodiments of the present invention, the processor, the memory, and the RF unit, which are provided in the BS, may be referred to as BS processor, BS memory, and BS RF unit, and the processor, the memory, and the RF unit, which are provided in the UE, may be referred to as UE processor, UE memory, and UE RF unit. In the present invention, the BS processor may be the processor located in the BS, or may be a BS controller connected with the BS through a cable or dedicated line to control the BS.

The BS processor may use a search space to transmit control information to the UE connected thereto. Control information for at least one UE may be transmitted to the search space. The BS processor may divide a search space within a downlink subframe into a plurality of sub-search spaces. Then, the BS processor may give order of priority to the respective sub-search spaces. Order of priority given to the divided sub-search spaces is associated with transmission of downlink control information to be transmitted to a specific UE, and may be associated with priority (or order) of blind decoding for a PDCCH at the UE. The BS processor may control the BS RF unit to allocate at least one PDCCH to the sub-search spaces on the basis of the given priority and transmit the PDCCH to the UE.

In the embodiment of the present invention, the PDCCH is the E-PDCCH transmitted through a portion of band of a data region of the downlink subframe.

Also, the BS processor may give order of priority to the plurality of sub-search spaces on the basis of data transmission information indicated by the corresponding PDCCH for the specific UE or aggregation levels of the sub-search spaces. In this case, the data transmission information may include at least one of a transmission data rate of a physical downlink shared channel (PDSCH), a payload size of transmission data, a transmission modulation scheme, or the number of resource blocks allocated to the PDSCH.

The UE processor may control the UE RF unit to receive a downlink signal in a downlink subframe from the BS. The UE processor may perform blind decoding for a plurality of PDCCH candidates of the search space configured in the data region of the downlink subframe. The UE processor may perform blind decoding in accordance with priority given to each of the plurality of sub-search spaces. If the blind decoding is successfully performed, the UE processor may start demodulation for the PDSCH designated by the corresponding PDCCH. In this case, if the result of blinding decoding for the sub-search space with high priority is not performed successfully, the UE processor may perform blind decoding for the sub-search space with low priority.

In this way, as the search space is divided into the plurality of sub-search spaces and order of priority is given to each of the sub-search spaces in accordance with the present invention, the BS transmits a PDCCH (for example, PDCCH for a PDSCH having a high transmission data rate) having a predetermined condition for the sub-search space with high priority to the UE, whereby the UE performs blind decoding for the sub-search spaces in the order of the sub-search spaces from lower priority to higher priority and acquires control information from the sub-search spaces with high priority. In this case, much time may be allocated to PDSCH demodulation and decoding, whereby complexity of the corresponding process may be reduced.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention may be used for a base station, a user equipment or other equipment in a wireless communication system.

The invention claimed is:

1. A method for receiving an enhanced physical downlink control channel (E-PDCCH) in a data region of a downlink subframe by a user equipment (UE) in a wireless communication system, the method comprising the step of:
   detecting the E-PDCCH by performing blind decoding of a plurality of E-PDCCH candidates included in a search space for the E-PDCCH,
   wherein the blind decoding is performed in accordance with an order of priority given to each of a plurality of sub-search spaces constituting the search space, and
   wherein the order of priority is determined based on downlink transmission information including at least one of a transmission data rate of a physical downlink shared channel (PDSCH) indicated by the E-PDCCH, a payload size of the PDSCH, a transmission modulation order of the PDSCH, and the number of resource blocks allocated to the PDSCH.

2. The method according to claim 1, further comprising the step of starting demodulation for a physical downlink shared channel (PDSCH) designated by the E-PDCCH, if the result of the blinding decoding is successful.

3. The method according to claim 1, further comprising the step of performing blind decoding for the sub-search space with low priority, if the result of the blind decoding for the sub-search space with high priority is not successful.

4. The method according to claim 1, wherein the E-PDCCH corresponding to the PDSCH with higher or larger transmission data rate, transmission modulation order, payload size or number of resource blocks is allocated to a sub-search space having a higher order of priority.

5. A user equipment configured to receive an enhanced physical downlink control channel (E-PDCCH) in a data region of a downlink subframe in a wireless communication system, the user equipment comprising:
   a radio frequency (RF) unit; and
   a processor,
   wherein the processor is configured to detect the E-PDCCH by performing blind decoding of a plurality of E-PDCCH candidates included in a search space for the E-PDCCH, and the blind decoding is performed in accordance with an order of priority given to each of a plurality of sub-search spaces constituting the search space, and
   wherein the order of priority is determined based on downlink transmission information including at least one of a transmission data rate of a physical downlink shared channel (PDSCH) indicated by the E-PDCCH, a payload size of the PDSCH, a transmission modulation scheme of the PDSCH, and the number of resource blocks allocated to the PDSCH.

6. The user equipment according to claim 5, wherein the processor is configured to start demodulation for a physical downlink shared channel (PDSCH) designated by the E-PDCCH, if the result of the blinding decoding is successful.

7. The user equipment according to claim 5, wherein the processor is configured to perform blind decoding for the sub-search space with low priority, if the result of the blind decoding for the sub-search space with high priority is not successful.

8. The user equipment according to claim 5, wherein the E-PDCCH corresponding to the PDSCH with higher or larger transmission data rate, transmission modulation order, payload size or number of resource blocks is allocated to a sub-search space having a higher order of priority.

9. A method for transmitting an enhanced physical downlink control channel (E-PDCCH) in a data region of a downlink subframe from a base station to a user equipment (UE) in a wireless communication system, the method comprising the steps of:
dividing a search space for the E-PDCCH including a plurality of E-PDCCH candidates into a plurality of sub-search spaces;
giving an order of priority to each of the plurality of sub-search spaces; and
transmitting the E-PDCCH to the user equipment through the sub-search spaces on the basis of the given order of priority,
wherein the order of priority is determined based on downlink transmission information including at least one of a transmission data rate of a physical downlink shared channel (PDSCH) indicated by the E-PDCCH, a payload size of the PDSCH, a transmission modulation scheme of the PDSCH, and the number of resource blocks allocated to the PDSCH.

10. The method according to claim 9, wherein the E-PDCCH corresponding to the PDSCH with higher or larger transmission data rate, transmission modulation order, payload size or number of resource blocks is allocated to a sub-search space having a higher order of priority.

11. A base station configured to transmit an enhanced physical downlink control channel (E-PDCCH) to a user equipment in a data region of downlink subframe in a wireless communication system, the base station comprising:
a processor,
wherein the processor is configured to
divide a search space for the E-PDCCH including a plurality of E-PDCCH candidates included in the downlink subframe into a plurality of sub-search spaces,
give an order of priority to each of the plurality of sub-search spaces, and
transmit the E-PDCCH to the user equipment through the sub-search spaces on the basis of the given order of priority, and
wherein the order of priority is determined based on downlink transmission information including at least one of a transmission data rate of a physical downlink shared channel (PDSCH) indicated by the E-PDCCH, a payload size of the PDSCH, a transmission modulation scheme of the PDSCH, and the number of resource blocks allocated to the PDSCH.

12. The base station according to claim 11, wherein the E-PDCCH corresponding to the PDSCH with higher or larger transmission data rate, transmission modulation order, payload size or number of resource blocks is allocated to a sub-search space having a higher order of priority.

* * * * *